United States Patent [19]

Hünger

[11] Patent Number: 4,457,531
[45] Date of Patent: Jul. 3, 1984

[54] TRAILER COUPLING

[76] Inventor: Walter Hünger, Otto-Nagler-Strasse 13, Wuerzburg, Fed. Rep. of Germany

[21] Appl. No.: 413,543

[22] Filed: Aug. 31, 1982

[51] Int. Cl.³ .............................................. B62D 53/08
[52] U.S. Cl. ................................... 280/433; 280/440; 384/421
[58] Field of Search ............... 280/433, 434, 435, 436, 280/437, 438 R, 438 A, 439, 440, 441, 485; 410/52, 58, 60, 63, 64; 308/221, DIG. 7, DIG. 8, DIG. 9; 384/421, 424, 425, 426, 427

[56] References Cited

U.S. PATENT DOCUMENTS 3,337,277  8/1967  Arnold ............................ 280/433 X
3,924,909 12/1975  Kent et al. ........................... 384/421
4,121,853 10/1978  McKay ............................ 384/421 X Primary Examiner—Joseph F. Peters, Jr.
Assistant Examiner—Mitchell J. Hill
Attorney, Agent, or Firm—Schwartz, Jeffery, Schwaab, Mack, Blumenthal & Koch

[57] ABSTRACT

A trailer coupling is provided with a sliding plate and a coupling plate having an anti-friction layer, preferably of a PTFE composite material. To make it possible that in operation the anti-friction surface always remains paired with the same counter surface so that they may matingly wear with each other, a steel plate is placed onto the king journal of the tractor covering the slide plate itself. The steel plate is finished to a depth of roughness of 1 μm. The bore of the steel plate permits passage of the king journal without additional clearance, so that the steel plate is maintained in position by tilting and no further connection is necessary between the steel plate and the slide plate.

5 Claims, 3 Drawing Figures

TRAILER COUPLING

BACKGROUND OF THE INVENTION

1. Field of the Invention

The present invention concerns a trailer coupling to connect a semitrailer with a tractor. In trailer couplings of this type, the vertical forces are transmitted from the semitrailer to the tractor by means of a coupling plate mounted on the latter, the coupling plate slidingly cooperates with a slide plate fastened to the semitrailer.

2. Description of the Prior Art

In order to insure the uninhibited movement of the plates with respect to each other, especially when the unit is travelling over curves, friction between the plates must be reduced as much as possible. In place of the still widely used grease lubrication, a trailer coupling is described in U.S. Pat. No. 3,337,277, incorporated herein by reference, wherein an anti-friction layer of polytetrafluoroethylene (PTFE) or another suitable synthetic plastic, is applied to the surface of the coupling plate, which is in sliding cooperation with the slide plate mounted on the trailer, to the free surface of which a sliding layer may also be applied.

The disadvantage of the known configuration is the relatively great wear to which the anti-friction layer or layers are exposed in travel. A principal cause of this wear is the fact that in the known configuration, no pairing or mating can be established among the plates as they wear together during operation, because in the normal operation of a truck tractor, different trailers may be attached alternatingly and the constantly changing surface structures lead to rapid wear of the anti-friction layers.

SUMMARY OF THE INVENTION

It is the object of the present invention to provide a trailer coupling with an anti-friction layer on a coupling plate wherein friction is further reduced and the life of the coupling extended.

The object is attained by providing a steel sheet in a trailer coupling with an anti-friction layer applied to the surface of the coupling plate. The steel sheet is mounted on the free surface of the slide plate, with the free surface of said steel sheet being finished to provide a smooth surface, as, for example, with a maximum roughness of 1 $\mu$m. A bore is provided in the steel sheet to admit the king journal, and the diameter of the bore is selected to permit sliding onto the journal without additional clearance. No other connection exists between the sheet of steel and the slide plate.

Fundamentally, it is most favorable for the useful life of the anti-friction layer, if its frictional partner consists of a steel surface as highly finished as possible. In the practice of daily operations, it is hardly possible to preserve the free surface of the slide plate itself so that a high finish quality with the lowest possible roughness is maintained. The arrangement according to the invention of a highly finished steel plate makes it possible to always associate the anti-friction layer of the coupling plate with the same highly finished steel surface, as the steel plate is movable so that it always remains with the same tractor or vehicle. The manner whereby the configuration of the steel plate according to the invention makes it feasible to attach and remove the steel plate in a simple fashion in the case of changing trailers to and from their slide plate, is illustrated hereinbelow in the description of the preferred embodiment.

In operation, the steel plate and the anti-friction layer will matingly wear together on each other so that the wear of the anti-friction layer is minimized. The steel plate remains with the tractor, thus when another trailer is to be attached, the steel plate belonging to the trailer is first mounted on the king journal of the new trailer.

The anti-friction layer advantageously consists of a composite material based on polytetrafluoroethylene (PTFE). It is possible to begin with fresh, sinterable PTFE, but reprocessed PTFE waste may also be used; it yields the composite material with the proper additives and binders.

Advantageously, the steel plate consists of stainless steel, because then the danger of corrosion and rusting is eliminated as these would harm the necessary surface quality. The latter may be obtained for example by hard chromizing.

DETAILED DESCRIPTION OF THE PREFERRED EMBODIMENT

Figure 1:
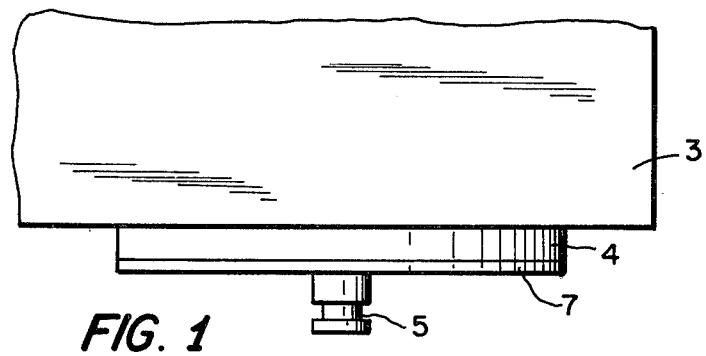
FIG. 1 shows the slide plate with the king journal of a semitrailer in a laterial elevation.
Figure 2:
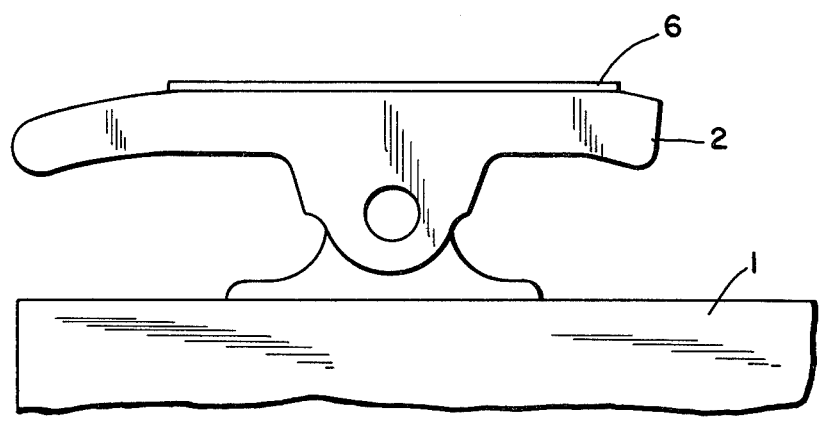
FIG. 2 illustrates the coupling plate of a tractor in a lateral elevation.

As shown in the drawing, coupling plate 2 is mounted in a conventional manner pivotingly around the transverse axle of a tractor 1 (not shown in detail). A slide plate 4 of a trailer 3, (not shown in detail) is lowered or slid onto the coupling plate 2, until a king journal 5 is locked in the closure of the coupling plate 2.

An anti-friction plastic layer 6 is applied to the surface of the coupling plate 2. A steel plate 7 is slid onto the king journal 5, with the bore therein provided for the admission of the king journal which is dimensioned so that the steel plate may be mounted without clearance. It then maintains itself by means of the tilt effect illustrated in FIG. 3.

Figure 3:
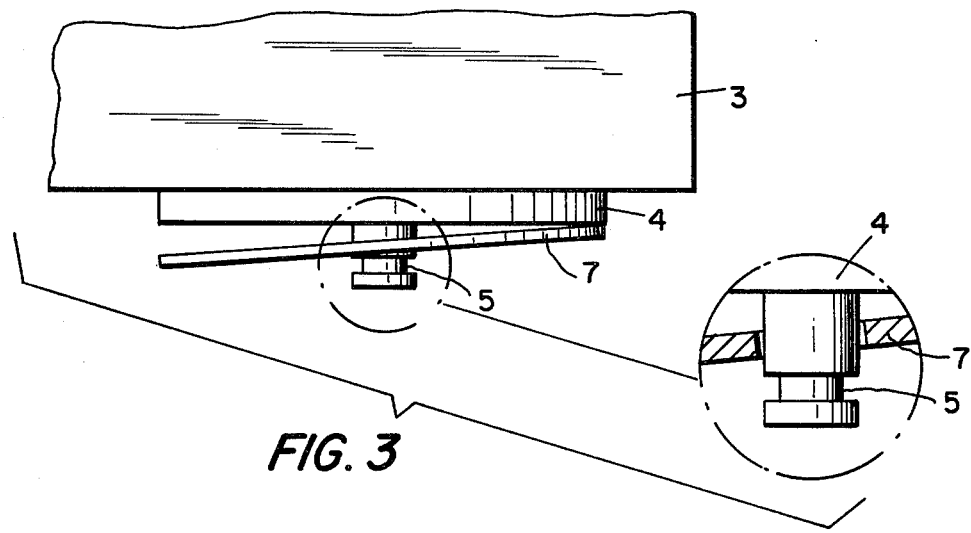
FIG. 3 shows the view according to FIG. 1 with the steel plate securing itself by tilting. The enlarged section of FIG. 3 is shown in cross-section.

Because of the seating without clearance (or with minimal clearance sufficient only to permit removal by rocking action back and forth) of the steel plate on the king journal, the steel plate cannot freely fall from the journal, because even in the case of a slight movement of the steel plate from the slide plate, the latter will tilt with respect to the king journal, thereby preventing the further sliding of the steel plate. This condition is shown in FIG. 3. On the other hand, the steel plate may be pulled off readily by hand from the king journal, if it is maintained in a rectangular alignment with respect to the journal. This removal may be further facilitated by the back and forth rotation of the steel plate. In this manner, no special connection is required between the steel plate and the slide plate for its mounting or removal.

In operation, a special fastening of the steel plate to the slide plate may also be omitted, because as the result of the high friction effective between the two structural parts, no mutual rotation can occur. The friction between the surface of the slide plate and the surface of the steel plate resting against it and directed upward, both of which lack any special finishing, is naturally substantially greater than the friction between the anti-friction plastic layer of the coupling plate and the highly finished free surface of the steel plate cooperating with it. For this reason, in actual operation only the antifriction layer will rotate with respect to the steel plate.

The free surface pointing downward of the steel plate 7, which is cooperating slidingly during operation with the anti-friction layer is highly finished, so that its roughness depth is preferably less than 1 μm. In this manner, it is obtained that in spite of the lack of fastening of the steel plate 7 to the slide plate 4, rotation occurs only between the steel plate 7 and the plastic anti-friction layer 6 with little or no wear because of the finished surface of the steel plate.

In daily operation thus, a certain steel plate belongs to a certain tractor 1. The steel plate may be mounted rapidly and simply on the slide plate of the trailer to be attached. In this manner, the anti-friction layer 6 is always paired with the same finely finished steel surface. The surfaces are thereby paired in alignment and able to matingly slide on each other. As a result, wear is reduced to a minimum and high useful lifetimes are obtained.

What is claimed is:

1. A trailer coupling for use in coupling a trailer to a vehicle such as a tractor comprising:
   a. a coupling plate mounted on said vehicle;
   b. an anti-friction layer mounted to said coupling plate;
   c. a slide plate mounted to said trailer;
   d. a journal mounted to the trailer and operable for locking engagement with said coupling plate to secure said trailer and vehicle; and
   e. an intermediate plate removably positioned between said slide plate and said anti-friction layer, said intermediate plate having a smooth surface thereof contacting said anti-friction layer during coupling of said trailer and vehicle, said intermediate plate having a bore therethrough for permitting passage of said journal with minimal clearance, tilting of said intermediate plate positioned on said journal with said minimal clearance providing the sole means for securing said intermediate plate to said journal whereby said intermediate plate is removably secured to said journal.

2. A trailer coupling as recited in claim 1 wherein said smooth surface of said intermediate plate has a maximum roughness of 1 μm.

3. A trailer coupling as recited in claim 1 wherein said intermediate plate is made of stainless steel.

4. A trailer coupling as recited in claim 1 wherein said anti-friction layer comprises a polytetrafluoroethylene (PTFE) material.

5. A method of utilizing a trailer coupling for coupling a trailer to a vehicle such as a tractor comprising the steps of:
   a. permanently mounting a coupling plate to said vehicle,
   b. permanently mounting an anti-friction layer to said coupling plate,
   c. permanently mounting a slide plate to said trailer,
   d. permanently mounting a journal to the trailer, said journal positionable for locking engagement with said coupling plate to secure said trailer and vehicle together,
   e. mounting an intermediate plate between said slide plate and said anti-friction layer, said mounting step including sliding said journal through an aperture of said intermediate plate with minimal clearance therebetween, tilting of said intermediate plate positioned on said journal with said minimal clearance providing the sole means for securing said intermediate plate to said journal,
   f. slidably contacting said intermediate plate with said anti-friction layer during coupling of said trailer and vehicle, and
   g. removing said intermediate plate and positioning the intermediate plate onto the journal of another trailer each time said another trailer is to be pulled by said vehicle, whereby said coupling plate, anti-friction layer and intermediate plate are always operatively associated together even though said another trailer is pulled by said vehicle.

* * * * *